(12) United States Patent
Otis

(10) Patent No.: US 6,223,767 B1
(45) Date of Patent: May 1, 2001

(54) STOWAGE RECEPTACLE FOR A RECREATIONAL VEHICLE WASTE HOSE

(76) Inventor: William Blake Otis, 3929 Cholla, Phoenix, AZ (US) 85028-2116

(*) Notice: Subject to any disclaimer, the term of this patent is extended or adjusted under 35 U.S.C. 154(b) by 0 days.

(21) Appl. No.: 09/541,881

(22) Filed: Apr. 1, 2000

(51) Int. Cl.$^7$ .................................................. F16K 27/12
(52) U.S. Cl. ..................... 137/355.16; 137/899; 138/106; 138/110
(58) Field of Search ............................. 137/899, 355.16; 138/106, 107, 110

(56) References Cited

U.S. PATENT DOCUMENTS

| | | |
|---|---|---|
| 3,924,661 | 12/1975 | Bornhoffer . |
| 4,133,347 | * 1/1979 | Mercer . |
| 4,180,102 | 12/1979 | Larkin . |
| 4,223,702 | 9/1980 | Cook . |
| 4,231,595 | 11/1980 | Knutsen . |
| 4,854,349 | 8/1989 | Foreman . |
| 4,905,939 | * 3/1990 | Horn ....................................... 248/49 |
| 5,023,959 | 6/1991 | Mercer . |
| 5,897,083 | 4/1999 | Johnson . |
| 5,904,183 | 5/1999 | Leech . |

* cited by examiner

*Primary Examiner*—A. Michael Chambers
(74) *Attorney, Agent, or Firm*—Sherman D. Pernia

(57) ABSTRACT

A receptacle mounted on the outside of a recreational vehicle (RV) is provided for stowing an RV's compressible waste drain hose. The stowage receptacle comprises a housing for receiving and storing the hose in a compressed configuration, and supports for mounting the housing to the outside of the vehicle. The stowage receptacle is mounted preferably under the vehicle, in a location where excess moisture can drain from apertures in the receptacle, and where airflow from the vehicle's movement can pass through the apertures and facilitate drying any residual moisture left in the receptacle or drain hose. Typically, the housing is mounted to an appropriate fame or chassis member, proximate the drain port for the vehicle's waste holding tank(s). When needed, the drain hose may be released and removed from the stowage receptacle.

12 Claims, 2 Drawing Sheets

STOWAGE RECEPTACLE FOR A RECREATIONAL VEHICLE WASTE HOSE

FIELD OF THE INVENTION

The present invention relates to special receptacles and supports for mounting such receptacles. More specifically the present invention relates to a receptacle for storing a recreational vehicle's compressible waste drain hose, and supports for mounting the receptacle on the outside of the vehicle.

BACKGROUND OF THE INVENTION

To enhance the comfort and convenience of recreational vehicles (RVs) such as motor homes, campers, and travel trailers; sinks, showers, and toilets have been installed on many RVs. Further, to promote the independence of RVs from continuous connection to a waste disposal facility, these RVs are equipped with holding tanks for storing waste water, sewage, and other fluids deposited into the sinks, showers, or toilets. A drain hose is used to transfer the stored wastes from the holding tank into suitable disposal facilities. Typically, the waste drain hose utilized for this purpose is flexible and of an accordion-like construction, which allows the hose to be collapsed along its length.

The waste drain hoses become fouled with the waste materials passed through them, and can become unpleasant to handle and store. Even when means are provided to flush the drain hose after use with fresh water, it is important to try to remove the excess moisture from the drain hose before storing. Removing the excess moisture from the drain hose can aid in reducing the unpleasantness of handling the drain hose when next used.

Various attempts have been made to provide devices for storing compressible waste drain hoses and can be found in the following patents. Leech, U.S. Pat. No. 5,904,183, May 18, 1999 discloses a hand-portable waste dispensing device having a waste drain hose inside of a drainer sheath. When not in use the Leech device is sealable to prevent escape of odors and liquid. Leech teaches a device that is integrated with the drain hose, and a drain sheath that is not mounted to a vehicle.

Johnson, U.S. Pat. No. 5,897,083, Apr. 27, 1999, discloses a retainer device for holding a typical flexible recreational vehicle waste hose in a compressed configuration. In Johnson '083 a waste drain hose is external to the retainer/storage device and thus does not contain the waste hose in an interior space.

Bornhoffer, U.S. Pat. No. 3,924,661, Dec. 9, 1975 teaches a container for storing a flexible waste drain hose for a recreational vehicle. The device disclosed in Bornhoffer '661 includes a semi-rigid, open-ended cylinder having a flexible drain hose protruding from each end of the cylinder, and a fiction engaging inner surface means. Therefore the cylinder of Bornhoffer '661 is slidable along the length of the extended drain hose to prevent bends or loops in the hose.

Foreman, U.S. Pat. No. 4,854,349, Aug. 8, 1989 teaches a waste dispensing device that integrates a housing and a waste drain hose into a single unit mounted on the chassis of a vehicle and connected to a waste drain port. The housing and drain hoses are integrated together at one of their ends by a coupling element that also connects the device to the drain port of a vehicle. A single cap mutually closes the other ends of the housing and the drain hose. The device disclosed in Foreman '349 is mounted to a vehicle in connection with the vehicle's waste drain port. The free end of the hose is stored compressed within the tubular housing and retained there by means of a dual closure cap. For draining, the cap is disengaged from the housing and the hose is extended with the cap in place. At the waste disposal system the cap is fully removed. After use, the drain hose is compressed back into the housing and sealed in place with the dual closure cap.

Larkin, U.S. Pat. No. 4,180,102, Dec. 25, 1979, discloses a two part housing enclosing a flexible waste drain hose for a recreational vehicle. The device disclosed in Larkin '102 includes a standard flexible waste drain hose, a two piece cylindrical housing made of two identical half cylinders, foam rubber strips at the open ends of the cylindrical housing, and removable slip rings for holding the housing halves in close engagement with the drain hose contained therein. Larkin '102 however, does not teach or disclose a device for stowage of the hose/housing combination, or a manner of mounting the device to a vehicle. Knutsen, U.S. Pat. No. 4,231,595, Nov. 4, 1980, discloses a waste dispensing device having an exterior housing and an extensible hose. The housing and the hose are connected together at one end. The device disclosed in Knutsen '595 includes a flexible tubular housing, a compressible waste drain hose contained within the housing, and a coupling joining the housing and the hose together at one of their ends with the hose inside of the housing. In practice, the Knutsen '595 device is left in place on the vehicle with the coupling connected to the waste drain port of a recreational vehicle. In use, the free end of the drain hose is drawn from the interior of the housing structure for insertion into a waste disposal system. For storage, the drain hose is compressed back into the housing. The free end of the flexible housing may then be releasably hung on a bracket attached to the vehicle. The Knutsen '595 device may then travel attached to the vehicle by the drain port coupling at one end and the bracket at the other end.

It is therefore desirable to develop a simple, alternative device for stowing a waste drain hose between uses outside the RV, where the storage receptacle provides for drainage and evaporation of moisture from the drain hose during storage.

SUMMARY OF THE INVENTION

The present invention is receptacle mounted on the outside of a recreational vehicle (RV) useful as a stowage container for the vehicle's compressible waste drain hose. The stowage receptacle comprises a housing for receiving an RV's compressible waste drain hose, and storing the hose in a compressed configuration, and supports for mounting the housing to the outside of the vehicle. The stowage receptacle is mounted to the vehicle, in a location where excess moisture can drain from apertures in the receptacle, and where airflow from the vehicle's movement can pass through the apertures and facilitate drying any residual moisture left in the receptacle or drain hose. Typically, the housing is mounted under the vehicle to an appropriate frame or chassis member, proximate the drain port for the vehicle's waste holding tank(s). When needed, the drain hose may be released and removed from the stowage receptacle.

The receptacle's housing is an elongated tubular sleeve having inner and outer surfaces, and a lumen defined by the inner surface for receiving the waste drain hose. The tubular sleeve has two ends. A first end of the tube is open to the lumen and is flared to facilitate inserting the drain hose into the lumen of the stowage receptacle. The second end of the sleeve is at least partially closed so as to retain the drain hose in the lumen of the sleeve as it is being loaded into the stowage receptacle. The elongated tubular sleeve is comprised of single piece lengths of tubing (unibodies). A unibody has a length of at least about three feet. The housing has a length sufficient to contain the waste drain hose in a compressed condition. The length of the housing may be adjusted by combining a plurality of unibody sections in series to provide a desired length. The housing has a cross-sectional configuration complementary to the waste drain hose. Typically, the housing has a cross-sectional configuration that is substantially circular, with an inside diameter of at least about three inches. However, diameters of up to about eight inched are practicable.

The tubular sleeve may comprise a solid-surfaced material, like PVC piping or similar tubing, or it may be made of a screen-like or mesh material, such as a cylinder formed from a sheet of expanded metal. If the tubular sleeve otherwise has solid surfaces, then vent apertures are formed through the inner and outer surfaces of tubular sleeve to provide fluid and gas communication between the lumen and the outer surface of the housing. The apertures provide for draining and evaporating residual moisture and vapors from the stowed drain hose and the interior (lumen) of the housing. This provision is facilitated by the movement of air through the apertures, as when the vehicle is moving.

An end-cap is utilized to closed the second end of the tubular sleeve sufficiently to prevent the waste drain hose from passing out of the second end of the housing. The end cap may be configured as an actual "cap," or as any other structural feature that acts to contain the drain hose within the housing. The end-cap may be relatively permanently fixed in place or it may be removable. An end-cap appropriate for practice with the present invention is readily selectable by the ordinary skilled artisan. Examples of such known end-capping or blocking means include: a glued on end-cap, a press fit end-cap, a threaded end-cap, a screen, a wire mesh, and even a second drain hose retainer.

Waste drain hoses typically have a fitting at each end, one fitting for coupling to the drain port of an RVs waste holding tank, and the other fitting for discharging the waste from the hose into a disposal facility. A waste drain hose is stowed in the present invention by inserting one end (usually the end with the smallest fitting) of the hose into the flared, open end of the housing. After the inserted end of the hose contacts the end-cap of the receptacle, the hose is then compressed along its length until its other end (usually the end with the larger fitting) is passed into the flared section of the open end of the housing. The flared section of the housing is configured accommodated a larger diameter of the drain hose fitting. Once the entire length of the drain hose is compressed into the lumen of the housing, a retainer is attached to the open end of the housing to contain the hose in place.

The retainer is a releasable mechanism that holds the waste drain hose in a compressed configuration within the lumen during storage, and which can be released to allow withdrawal of the hose from the housing. The retainer is disposed proximate the flared, open end of the tubular sleeve. A retainer mechanism may be accomplished by a simple pin which passes through the walls of the housing, and between the end of the compressed drain hose and the opening in the flared end of the housing. Multiple pins may be used if desired, including for example, a U-shaped pin or a pin with multiple tines. The bias of the compressed hose against the retainer pin aids in preventing the inadvertent removal of the pin. Alternatively, the pin may incorporate an extraction locking means, such as are known in the art to prevent its inadvertent removal. If desired, a grommet may be placed between the end of the compressed hose and the pin to provide additional bias, or to act as a spacer. Both the pin and the grommet may be tethered to the receptacle or to the vehicle to keep them at hand and prevent their loss. Other retainer mechanisms appropriate for practice with the present invention are readily selectable by the ordinary skilled artisan.

Supports are used to mount or attach the housing to a location on the outside of the RV accessible to air flow. The supports or mounts attach the housing to a frame or chassis member, preferably on the underside of the vehicle or the bumper. Various support or mount means are known in the art. The specific support or mount configuration for practice of the present invention with a particular vehicle is readily selectable by one of ordinary skill in the art in view of the teachings and figures disclosed herein. Depending on the configuration of the vehicle, the present stowage receptacle may be attached to an RV using for example U-clamps, plumbers tape, stand-offs, brackets, hose clamps and any combination thereof, as mounts or supports.

The present invention is also practicable as a kit. The kit can contains all of the parts and materials necessary to practice an embodiment of the present invention, or a subset thereof. The kit can be customized to allow practice of the present receptacle with a specific model RV's chassis or frame configuration (vehicle make & model). For example, a kit for a recreational vehicle mounted waste drain hose stowage receptacle may comprise: a small parts set including a retainer and an end-cap for constructing a stowage receptacle housing from a tubular sleeve; mount hardware for attaching the stowage receptacle housing to the RV; and instructions for assembling the stowage receptacle housing and mounting it on the recreational vehicle to provide a recreational vehicle mounted stowage receptacle. A container is provided for holding the small parts set, the mount hardware and the instructions. In this case, the larger or heavier items (the tubular sleeve) may be purchased separately (and locally), and the entire device assembled and mounted by the user. Materials practicable as the tubular sleeve or unibody of the present invention are commercially available. One example is a 4 inch by 10 foot length of CDEX type perforated plastic. The user may cut off the pipe to the desired length, or may add an additional length if desired. The small parts set comprises a cap for closing the second end of the tubular sleeve, and a retainer and any other materials that are appropriate to the set, such as a grommet, or spare pins, etc.

Other and further features and advantages will be apparent from the following description of presently preferred embodiments of the invention, given for the purpose of disclosure and taken in conjunction with the accompanying drawings.

DETAILED DESCRIPTION OF THE INVENTION

Figure 1:
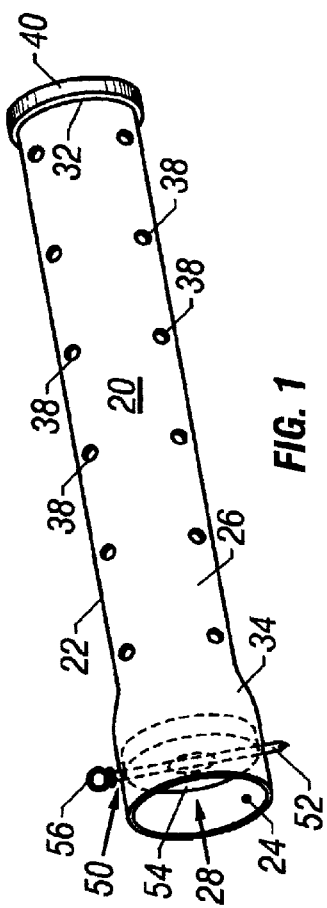
FIG. 1 is a perspective view of the present stowage receptacle for a recreational vehicle waste drain hose.

Referring now to the drawings, the details of preferred embodiments of the present invention are graphically and schematically illustrated. Like elements in the drawings will be represented by like numbers, and similar elements will be represented by like numbers with a different lower case letter suffix.

FIG. 1 shows an embodiment of the stowage receptacle 10 for a recreational vehicle waste hose of the present invention. The stowage receptacle 10 comprises a housing 20 for receiving an RVs compressible waste drain hose, and storing the hose in a compressed configuration, and supports 60 (see FIG. 4) for mounting the housing 20 to the outside of the vehicle. The housing 20 is mounted to the vehicle, in a location where excess moisture can drain from apertures 38 in the housing 20, and where airflow from the vehicle's movement can pass through the apertures 38 and facilitate drying any residual moisture left in the housing 20 or drain hose.

Figure 2:
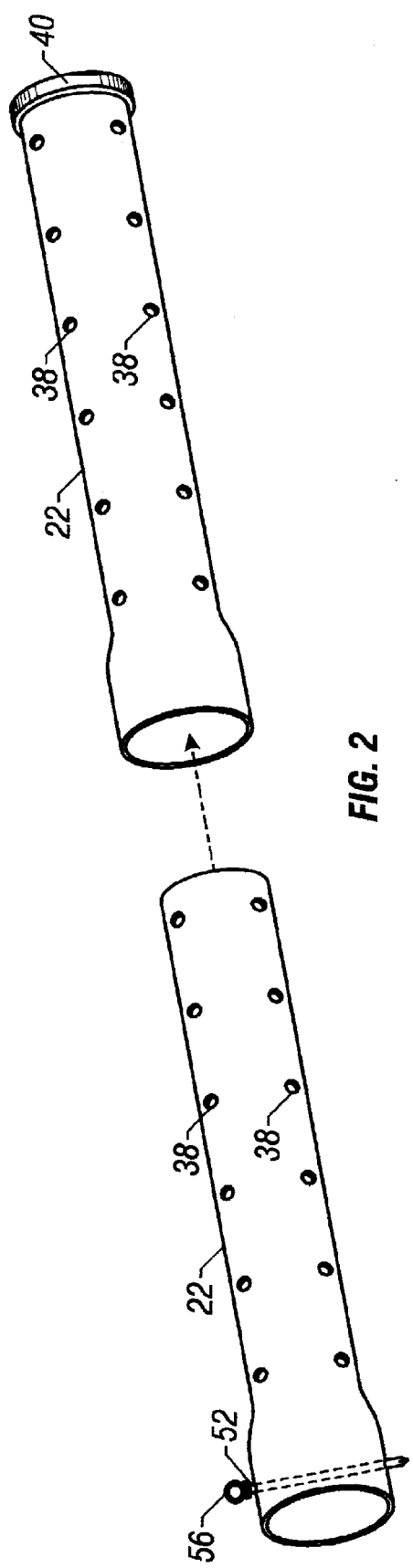
FIG. 2 is a perspective view of two unibody tubular sleeves showing how they can be combined in series to provide a receptacle housing of increased length.

The housing 20 is an elongated tubular sleeve 22 having an inner surface 24 and outer surface 26. A lumen or interior compartment 28 for receiving and containing the waste drain hose is defined by the inner surface 24 of the housing 20. The housing 20 has a first end 30 and a second end 32. The first end 30 of the housing 20 is open to the lumen 28. The first end or open end 30 has a flared section 34 to facilitate inserting the drain hose into the lumen 20 of the stowage receptacle 10. The second end 32 of the housing 20 is at least partially closed so as to retain the drain hose in the lumen 28 of the housing 20. The elongated tubular sleeve 22 is comprised of single piece lengths of tubing (unibodies). A unibody has a length of at least about three feet. The housing 20 has a length sufficient to contain the waste drain hose in a compressed condition. As shown in FIG. 2, the length of the housing 20 may be adjusted by combining a plurality of unibody or tubular sleeve sections 22 in series to provide a desired length. The housing 20 has a cross-sectional configuration complementary to the waste drain hose to be contained in the receptacle 10. In the preferred embodiment shown in the figures, the housing 20 has a cross-sectional configuration that is substantially circular, with an inside diameter of at least about three inches. However, diameters of up to about eight inched are practicable in the device 10. A preferred embodiment utilizes a 4 inch by 10 foot length of CDEX perforated plastic as the tubular sleeve or unibody 22.

The tubular sleeve or unibody 22 may comprise a solid-surfaced material, like PVC piping or similar tubing, or it may be made of an open material, such as a cylinder formed from a sheet of expanded metal. If the tubular sleeve 22 otherwise has solid surfaces, then vent apertures 38 are formed through the inner and outer surfaces 24, 26 of the tubular sleeve 22, to provide fluid and gas communication between the lumen 28 and the outer surface 26 of the housing 20. The apertures 38 provide for draining and evaporating residual moisture and vapors from the stowed drain hose and the lumen 28 of the housing 20.

Figure 3:
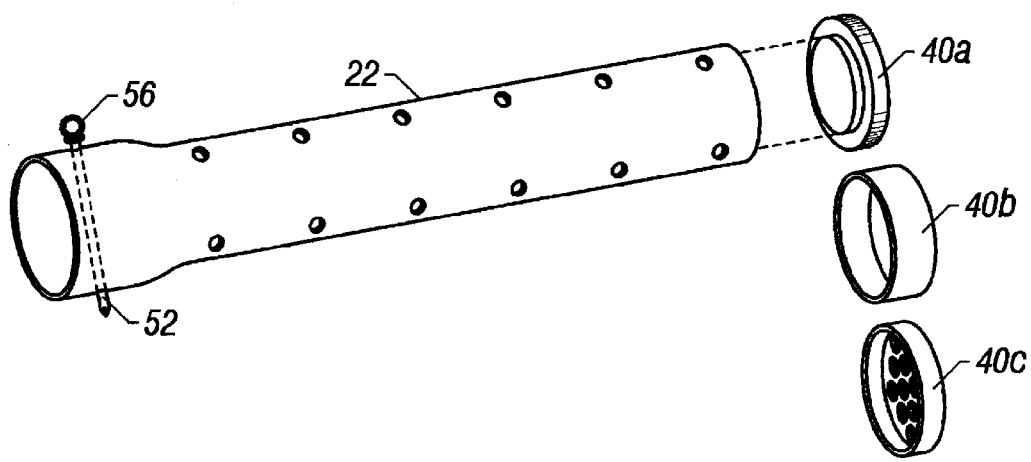
FIG. 3 is a perspective view showing the relationship between a unibody tubular sleeve and various types of "cap"type end-caps.

An end-cap 40 is utilized to closed the second end 32 of the housing 20 sufficiently to prevent the waste drain hose from passing out of the second end 32 of the housing 20. As shown in FIG. 3, the end-cap 40 may be configured as an actual "cap," or alternatively as any other structural feature (not shown) that acts to contain the drain hose within the housing 20. The end-cap 40 may be relatively permanently fixed in place or it may be removable. An end-cap 40 appropriate for practice with the present invention is readily selectable by the ordinary skilled artisan. Examples of such known end-capping or blocking means include: a threaded or twist-on end-cap 40a, a glued on end-cap 40b, a press fit end-cap not shown, a screen or mesh end-cap 40c, and even a second drain hose retainer.

In using the present invention, a waste drain hose is stowed in the receptacle 10 by inserting one end the hose into the open end 30 of the housing 20, and then compressing the hose along its length until its other end is passed into the flared section 34 of the open end 30 of the housing 20. Once the entire length of the drain hose is compressed into the lumen 28 of the housing 20, a retainer 50 is attached proximate the open end 30 of the housing 20 to contain the hose in place.

The retainer 50 is a releasable mechanism that holds the waste drain hose in a compressed configuration within the lumen 28 during storage, and which can be released to allow withdrawal of the hose from the housing 20. The retainer 50 is disposed proximate the flared, open end 30 of the housing 20. A retainer mechanism 50 may be accomplished by a simple pin 52 which passes through walls of the housing 20 in the plan of a cross-section of the lumen 28 and between the end of the compressed drain hose and the opening in the flared end 30 of the housing 20. Multiple retainer pins 52 may be used if desired, including for example, a U-shaped pin or a pin with multiple tines. The bias of the compressed hose against the retainer pin 52 aids in preventing the inadvertent removal of the pin 52. Alternatively, the retainer pin 52 may incorporate an extraction locking means (not shown), such as are known in the art to prevent its inadvertent removal. If desired, a grommet 54 may be placed between the end of the compressed hose and the retainer pin 52. The grommet 54 may be used to increase the bias between the retainer pin 52 and the compressed drain hose, or to serve as a spacer. Both the pin 52 and the grommet 54 may be tethered to the receptacle 10 or to the vehicle to keep them at hand and prevent their loss. An eye 56 may be provided in the pin retainer 52 as a point to which a tether may be attached. Other retainer mechanisms appropriate for practice with the present invention are readily selectable by the ordinary skilled artisan.

Figure 4:
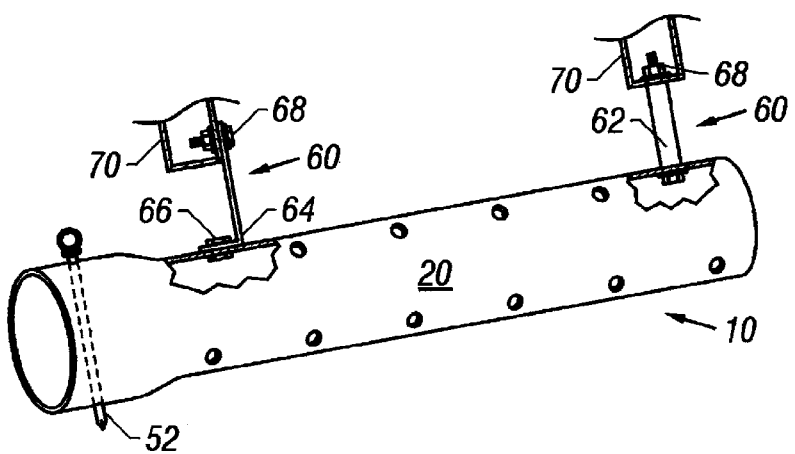
FIG. 4 is a combined perspective and cross-sectional view showing various supports for mounting the housing of the present invention to frame or chassis members under an RV.

As shown in FIG. 4, supports 60 are used to mount or attach the housing 20 to a location on the outside of the RV accessible to air flow. The supports or mounts 60 attach the housing 20 to a frame or chassis member 70, preferable on the underside of the vehicle or the bumper (see FIG. 4). Various support or mount means are known in the art. The specific support or mount configuration for practice of the present invention with a particular vehicle is readily selectable by one of ordinary skill in the art in view of the teachings and figures disclosed herein. Depending on the configuration of the vehicle, the present stowage receptacle 10 may be attached to an RV using for example U-clamps, plumber's tape, stand-offs 62, brackets 64, hose clamps and the like, and any combination thereof, as mounts or supports 60. A variety of hardware fasteners are available to accomplish the attachment of the housing 20 to the supports 60 and the frame or chassis member 70 of the RV, including rivets 66, and nut & bolt combinations 68.

The present invention is also practicable as a kit. The kit can contains all of the parts and materials necessary to practice an embodiment of the present invention, or a subset thereof The kit can be customized to allow practice of the present receptacle 10 with a specific model RV's chassis or frame configuration. For example, a kit for a recreational vehicle mounted waste drain hose stowage receptacle 10 may comprise: a small parts set including a retainer 50 and an end-cap 40 for constructing a stowage receptacle housing 20 from a tubular sleeve 22; mount 60 hardware for attaching the stowage receptacle housing 20 to the RV; instructions for assembling the stowage receptacle housing 20 and mounting it on the RV, to provide a recreational vehicle mounted stowage receptacle. The kit components are packaged in a container for holding the small parts set, the mount hardware and the instructions. In a preferred embodiment of the kit, the larger or heavier items (the tubular sleeve) may be purchased separately (and locally), and the entire device assembled and mounted by the user. Materials practicable as the tubular sleeve 22 or unibody of the present invention are commercially available, and may be purchased over the counter by a user.

While the above description contains many specifics, these should not be construed as limitations on the scope of the invention, but rather as exemplifications of one or another preferred embodiment thereof. Many other variation are possible, which would be obvious to one skilled in the art. Accordingly, the scope of the invention should be determined by the scope of the appended claims and their equivalents, and not just by the embodiments.

What is claimed is:

1. A recreational vehicle mounted stowage receptacle for a compressible waste drain hose comprising:

a housing for receiving and releasably retaining the waste drain hose, the housing being an elongated tubular sleeve, the tubular sleeve having inner and outer surfaces, a lumen defined by the inner surface for receiving the waste drain hose, and first and second ends, wherein the first end is a flared and open end, and the second end is closeable;

apertures formed through the surfaces of tubular sleeve for providing fluid communication between the lumen and the outer surface of the tubular sleeve;

an end-cap for closing the second end of the tubular sleeve;

a retainer for retaining the waste drain hose in a compressed configuration within the lumen, the retainer means being proximate the open end of the tubular sleeve, and releasable to allow withdrawal of the waste drain hose from the housing; and a mount attaching the housing to a location on the recreational vehicle accessible to air flow.

2. The recreational vehicle mounted stowage receptacle of claim 1 wherein the housing further comprises the elongated tubular sleeve being a unibody tubular sleeve.

3. The housing of claim 2 further comprising the housing having a length sufficient to contain the waste drain hose in a compressed condition.

4. The housing of claim 3 wherein the housing further comprises a plurality of unibody tubular sleeves in series to provide the length sufficient to contain the waste drain hose in a compressed condition.

5. The housing of claim 2 wherein the elongated tubular sleeve has a length of at least about three feet.

6. The recreational vehicle mounted stowage receptacle of claim 1 wherein the housing further comprises the tubular sleeve having a cross-sectional configuration complementary to the waste drain hose.

7. The housing of claim 6, wherein the tubular sleeve has a cross-sectional configuration that is substantially circular.

8. The housing of claim 6, wherein the tubular sleeve has a cross-sectional configuration that is substantially circular and has an inside diameter of at least about three inches.

9. The recreational vehicle mounted stowage receptacle of claim 1 wherein the cap is selected from the group consisting of a glued on end-cap, a press fit end-cap, a threaded end-cap, a screen, a wire mesh, and a waste drain hose retainer.

10. The recreational vehicle mounted stowage receptacle of claim 1 wherein the retainer is selected from the group consisting of: a retainer pin and a removable cover.

11. The recreational vehicle mounted stowage receptacle of claim 1 further comprising a grommet positionable between the retainer and a drain hose contained within the lumen of the housing.

12. The recreational vehicle mounted stowage receptacle of claim 1 wherein the mount is selected from the group consisting of U-clamps, plumbers tape, brackets stand-offs, and hose clamps.

* * * * *